United States Patent [19]

Forster et al.

[11] 4,180,973
[45] Jan. 1, 1980

[54] VEHICULAR GAS TURBINE INSTALLATION WITH CERAMIC RECUPERATIVE HEAT EXCHANGER ELEMENTS ARRANGED IN RINGS AROUND COMPRESSOR, GAS TURBINE AND COMBUSTION CHAMBER

[75] Inventors: Siegfried Förster, Alsdorf; Günther Hewing, Jülich; Manfred Kleeman, Quadrath-Ichendorf, all of Fed. Rep. of Germany

[73] Assignee: Kernforschungsanlage Julich Gesellschaft mit beschrankter Haftung, Jülich, Fed. Rep. of Germany

[21] Appl. No.: 858,015

[22] Filed: Dec. 6, 1977

[30] Foreign Application Priority Data

Mar. 19, 1977 [DE] Fed. Rep. of Germany ....... 2712136

[51] Int. Cl.² .............................................. F02C 7/10
[52] U.S. Cl. ........................ 60/39.51 R; 165/DIG. 8
[58] Field of Search ........ 60/39.32, 39.51 R, 39.51 H; 165/81, DIG. 8

[56] References Cited

U.S. PATENT DOCUMENTS

| | | | |
|---|---|---|---|
| 2,631,429 | 3/1953 | Locklin | 60/39.51 R |
| 3,118,278 | 1/1964 | Hill | 60/39.51 R |
| 3,121,559 | 2/1964 | Tippmann | 165/81 |
| 3,507,115 | 4/1970 | Wosika | 60/39.51 R |
| 4,070,825 | 1/1978 | Kronogard | 60/39.51 R |

FOREIGN PATENT DOCUMENTS

726347  3/1955  United Kingdom ............... 60/39.51 R

*Primary Examiner*—Louis J. Casaregola
*Attorney, Agent, or Firm*—Frishauf, Holtz, Goodman & Woodward

[57] ABSTRACT

The heat exchanger elements, arranged in a ring around a compressor, gas turbine and combustion chamber that have a common axis of symmetry, are supported on a framework having elastic inserts for compensating for or accommodating to thermal stresses and are so connected to an inner and an outer casing portion that free spaces for each of the heat exchanging media (hot exhaust gas and compressed air) are provided inside the unit communicating with the heat exchanger elements. Ducts for the hot gases are surrounded by cooler gases provided in these free spaces to reduce thermal stresses. The casing portions themselves provide some of the duct walls, so that a compact and sturdy unit is provided.

14 Claims, 6 Drawing Figures

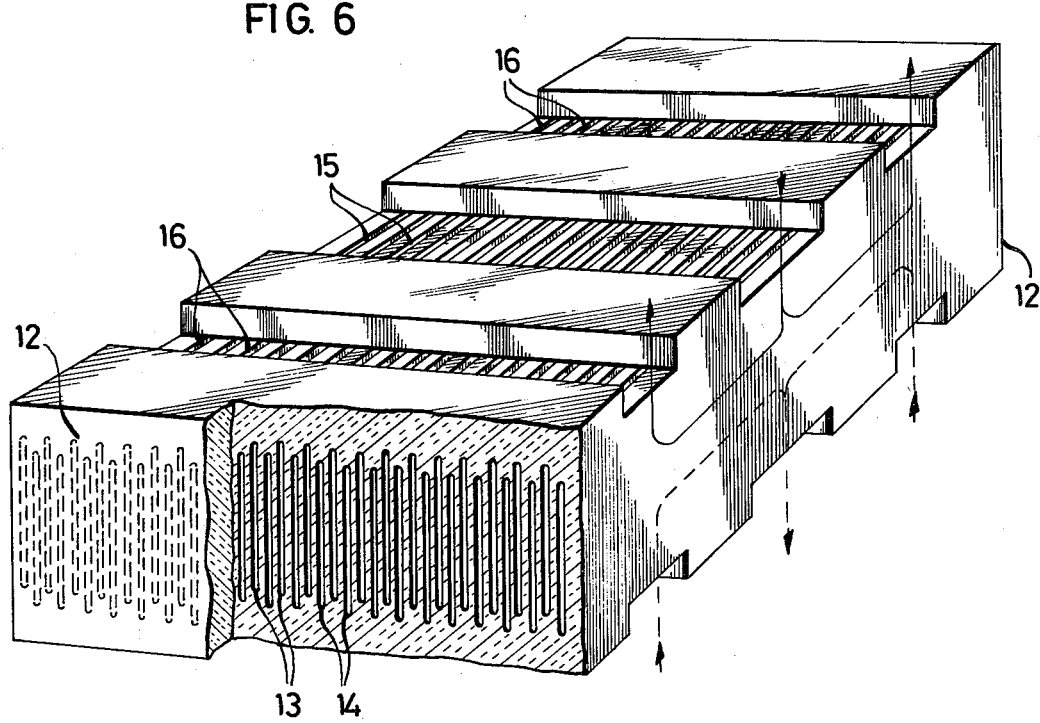

VEHICULAR GAS TURBINE INSTALLATION WITH CERAMIC RECUPERATIVE HEAT EXCHANGER ELEMENTS ARRANGED IN RINGS AROUND COMPRESSOR, GAS TURBINE AND COMBUSTION CHAMBER

This invention relates to a gas turbine installation for a vehicle drive comprising a compressor for sucking in and compressing air for support of combustion and forcing it into a combustion chamber which has an inlet for fuel and on the exhaust side of which a recuperative heat exchanger is provided for preheating compressed air. Of course the hot gas produced in the combustion chamber is fed to a turbine rotating a drive shaft for the vehicle. The discharge of the gas turbine goes to an exhaust gas duct so connected with the recuperative heat exchanger that the exhaust gas flows in countercurrent to the compressed air through the heat exchanger before the exhaust gas is led away. The gas turbine, compressor and combustion chamber are so arranged in an overall casing that they have a common axis of symmetry.

Gas turbine installations of this kind are of great interest for powering vehicles because of their greatly reduced exhaust gas problems with reference to the increasing requirements for preserving the cleaniness of the surrounding air. Operating temperatures at the turbine input over 1,000° C. are required, however, for gas turbine installations usable in vehicles, in order to keep small the engine's dimensions while maintaining a high efficiency. The efficiency of the gas turbine depends essentially also on the efficiency of the heat exchanger that utilizes residual energy still contained in hot exhaust gases for preheating the freshly sucked in and compressed air to be supplied to the turbine. By efficiency of the heat exchanger is understood the ratio the heat actually transferred in the heat exchanger to the heat theoretically transferable with an infinite heat exchange surface. Because of the high temperature from the hot gas side of the heat exchanger, the materials for such equipment must be limited to highly heat resistant metals or ceramic materials.

Extensive heat exchange surface areas are required for recuperative heat exchangers of high efficiency. The tube type of heat exchanger heretofore recommended requires a great deal of the space available in a vehicle. Crossed flow heat exchangers of plate construction have also been tried, as disclosed in "Problems of the Heat Exchanger for Vehicular Gas Turbines" by E. Tiefenbacher, in ASME Publication 76-GT-105 of 1976. In that case, however, substantial problems arise concerning the control of the heat stresses to which the heat exchanger matrices are subject.

In order to avoid these disadvantages, it is known to equip gas turbine installations designed for vehicles with heat exchangers that operate regeneratively. The heat exchangers of this type are made of ceramic and are formed as discs that are driven in rotation. The discs revolve successively between pipe segments of the exhaust piping and between pipe segments of the compressed air piping, so that there is alternately a heating up and cooling down of the discs in the respective sectoral regions corresponding to the heating zone and cooling zone (compare the above cited publication). The sealing of the rotating heat exchanger involves substantial difficulties, however, because of the substantial pressure differences between the heating and cooling zones because of the high operating temperatures. The seal gaskets wear away after a few hours of operation.

The Present Invention. It is an object of the present invention to provide a gas turbine equipment of higher efficiency by the provision therein of recuperative heat exchangers with large heat exchange surfaces while so utilizing the space available in the vehicle for locating the heat exchanger that a combined assembly results which is relatively compact. At the same time, the heat exchanger shouled be so arranged that the individual components of the gas turbine equipment, particularly gas turbine and compressor, are accessable for maintenance and repair and can be mounted and disassembled in a simple manner.

Briefly, the recuperative heat exchanger is made of plurality of elongated ceramic block heat exchanger elements of the double-flow type arranged in a ring encircling compressor, gas turbine and combustion chamber, with the gases flowing through these elements in countercurrent in such a way that the middle portion is more exposed to extreme temperature than the ends, and the heat exchanger elements are supported elastically on support members that are compensated for thermal expansion.

By virtue of the annular arrangement of the heat exchanger elements, not only do the gas turbine, compressor and combustion chamber of the gas turbine equipment have good accessibility, but also short gas ducts are obtained and thereby compact drive units. For the heat exchanger elements, recuperative ceramic heat exchangers are suitable, of the kind described in German Patent application No. P 27 07 290.8, that is commonly owned with the present application, and will be published in due course. The heat exchangers have a plurality of flow channels arranged next to each other with thin separating walls, so that the media that are in heat exchange with each other flow in each case through adjacent flow channels in countercurrent. The heat exchangers are constructed in a plate-type structure, with heat exchanger elements either flat or else curved in a dish-shaped or bowl configuration which is suitable for insertion in a gas turbine installation. The heat exchanger elements are supported each with respect to the other, and also with respect to their mounting in the casing, by seating elements that compensate for the thermal expansion that takes place in the operation of the gas turbine equipment. Preferably the support structure includes elastic intermediate layers of ceramic fiber material located both between ceramic heat exchanger elements and also between metallic supporting parts and ceramic heat exchanger elements.

In order to simplify the mounting of the heat exchanger elements and the accessibility of the drive assemblies of the gas turbine equipment, the heat exchanger elements are mounted between an inner casing portion in which the compressor and the gas turbine are mounted on their respective bearings and an outer casing portion enclosing the heat exchanger elements as a casing shell for them.

By a further development of the invention, the heat exchanger elements preferably have connections to gas ducts for the gas that is under high pressure, these connections being located on the sides of the heat exchanger elements that face towards the outer casing portion. The heat exchanger elements are thereby pressed against their support mounting on the inner casing portion and secured against shifting. In order to keep the external casing portions at low temperature, the connections of the heat exchanger elements for the hot gases are preferably cooled by a flow of cold gas. This is preferably performed by placing the gas duct connections for the hot gases inside the gas duct connections for the cold gases. As a still further development of the invention, at least a part of the gas ducting is constituted as a load-bearing casing wall.

DRAWINGS, ILLUSTRATING EXAMPLES

The invention is further described by way of illustrative examples with reference to annexed drawings in which:

FIG. 6 is a perspective view, partly cut away to show a section, of a heat exchanger element for use in a gas turbine installation according to the invention.

DESCRIPTION OF ILLUSTRATIVE EMBODIMENTS

Figure 1:
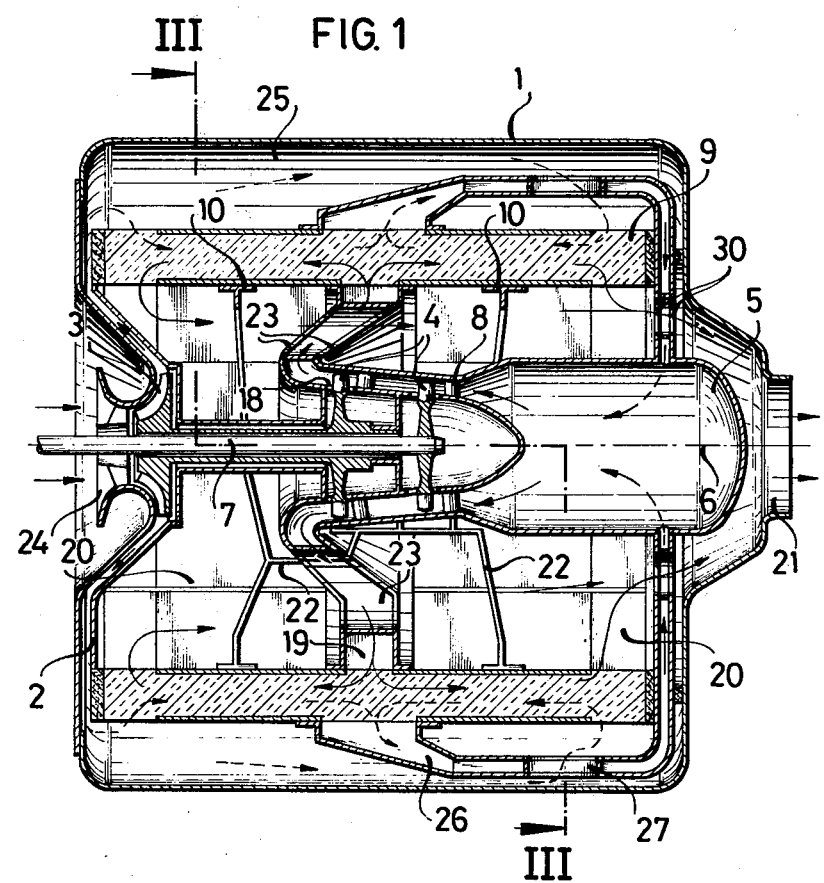
FIG. 1 is a diagramatic longitudinal section of a gas turbine equipment with a pot-type combustion chamber and heat exchanger elements that form a ring, of delta-shaped peripheral cross-section, around the gas turbine, compressor and combustion chamber.
Figure 2:
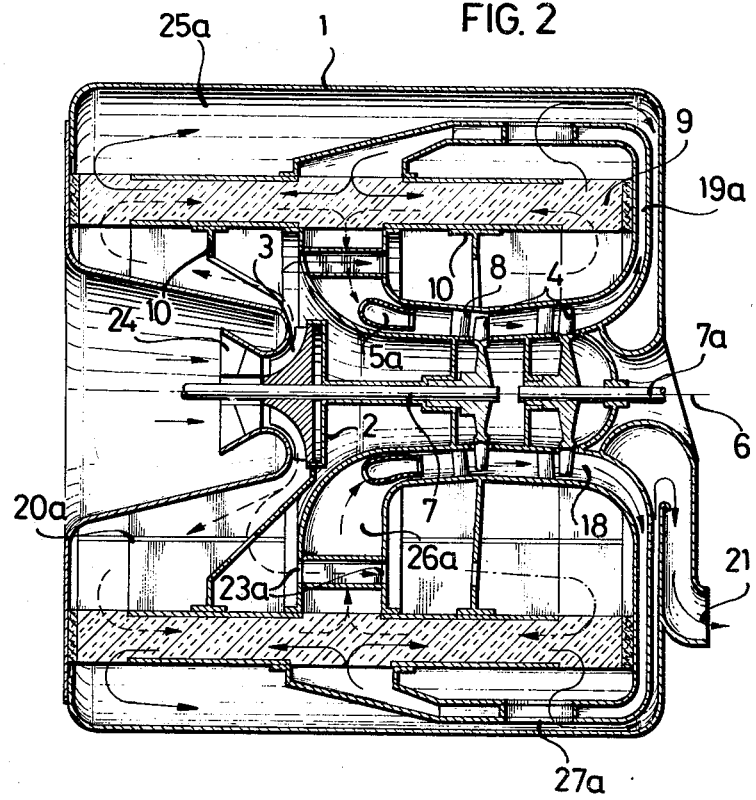
FIG. 2 is a diagramatic longitudinal section of a gas turbine equipment having an annular combustion chamber and having heat exchanger elements in the same arrangement as those of FIG. 1.
Figure 4:
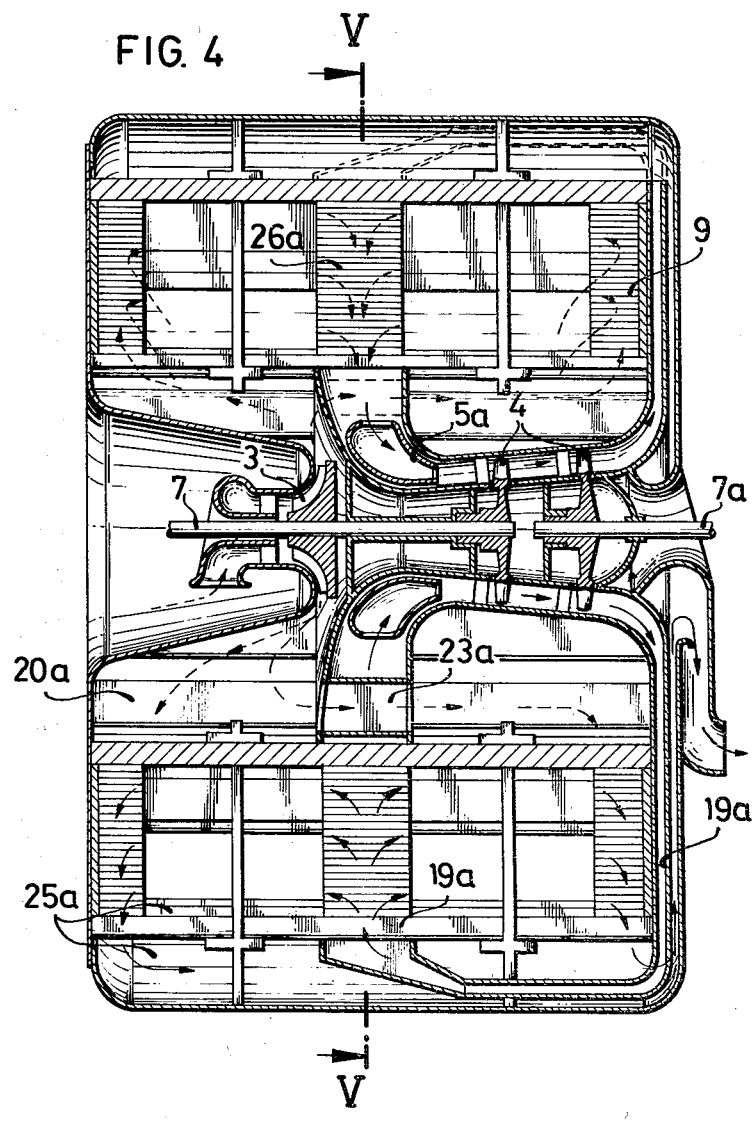
FIG. 4 is a longitudinal section of a gas turbine equipment with an annular combustion chamber and a set of heat exchanger elements forming a star-shaped ring around the gas turbine, compressor and combustion chamber.

As the drawings show, the casing of the gas turbine equipment according to the invention consists of an outer casing portion 1 and an inner casing portion 2, in which there are arranged a compressor 3, a gas turbine 4 and combustion chamber 5 in such a way that they have a common axis of symmetry 6. In the illustrated examples, the compressor 3 and the gas turbine 4 are mounted together as a turbo-assembly unit. The gas turbine 4 is constituted of two stages. As is particularly clear in the embodiment of FIG. 2, only the second stage of the gas turbine 4 is connected to compressor 3, while the first stage delivers energy for the vehicle drive over a separate drive shaft 7a. In FIG. 1 the second turbine stage and the compressor rotor are mounted on a connection sleeve on the drive shaft 7 so as to provide an equivalent arrangement. The combustion chamber 5 built adjacent to the gas turbine can be built as a pot-shaped chamber 5 (FIG. 1) or as a annular combustion chamber 5a, in the latter case being preferably located between compressor 3 and the gas turbine 4 (FIGS. 2 and 4). The fuel feed for the combustion chamber 5 is not particularly shown in the drawings in order to simplify the illustration, since its provision is a well known detail and it need not be shown for the understanding of the present invention.

Figure 3:
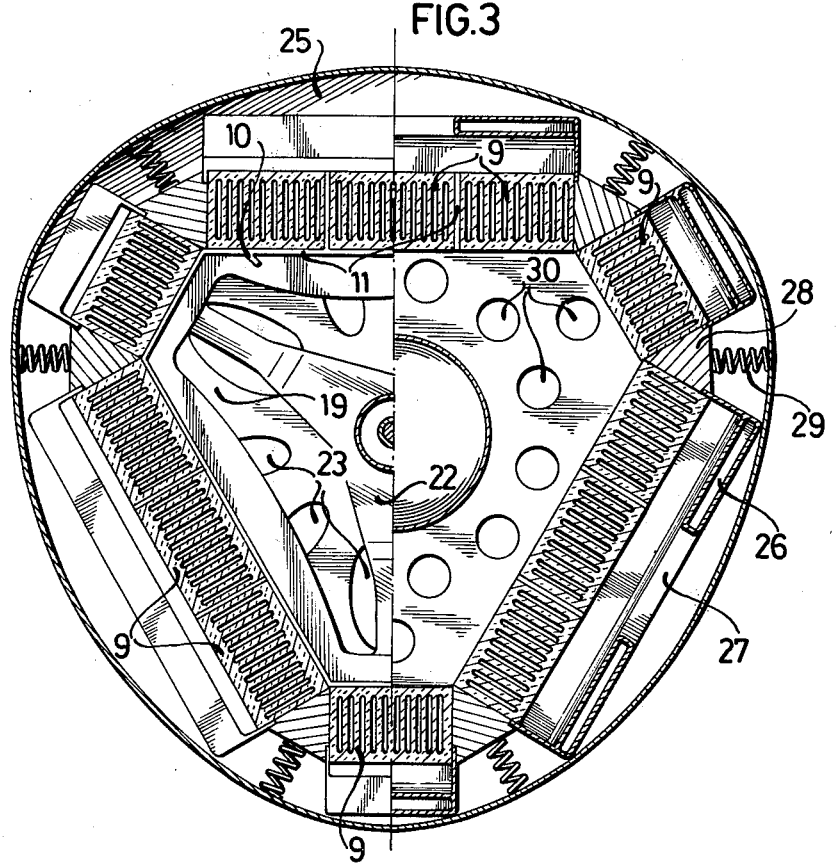
FIG. 3 is a cross-section through the ring of heat exchanger elements of FIG. 1, along the section line III of FIG. 1, the diagram being divided vertically so that one half shows a section in the plane designated by III at the upper left of FIG. 1 and the other half shows a section in the plane designated by III at the lower right of FIG. 1.

Ceramic heat exchanger elements 9 are provided as the recuperative heat exchangers, and they enclose annularly the compressor 3, the gas turbine 4 and combustion chamber 5. The individual heat exchanger elements are held radially on metallic supports 10, and elastic inserts 11 are interposed that consist of a material built up on a base of ceramic fibers. Thermal expansion produced during operation is compensated for within the supports 10 and their elastic interposed layers 11. For further compensation of thermal expansion, elastic insertions or gaskets 11 are also interposed between individual heat exchanger elements 9 (FIG. 3).

The shape of the ring of heat exchanger elements 9 can be circular, polygonal or delta-shaped in a cross-section perpendicular to the motor axis. In order to utilize the available space in a vehicle in optimum fashion, the delta-shaped construction is preferred. For high driving loads (and power) and high gas throughput, a star-shaped (FIG. 5) arrangement of heat exchanger elements is particular by suitable.

FIG. 6 shows an individual heat exchanger element, in this case of generally rectangular or "flat" configuration. The heat exchanger element has a multiplicity of flow channels that are of rectangular cross-section, extending between two gas-tight end faces 12, and disposed parallel to each other in two interleaved and slightly staggered sets. Each set of alternate channels (the pair 13 belongs to one set and the pair 14 to the other) has a flow therethrough of one of the media that is subjected to heat exchange in the device. The media flow through the heat exchanger element in countercurrent.

In-flow openings and out-flow openings for gases are located towards both ends and also in the middle region of the heat exchanger element, as shown by the arrows in the right hand portion of FIG. 6. The hot exhaust gas flows through in-flow openings in the middle region of the heat exchanger element into the flow channels 13 and leaves the latter through the out-flow openings 16 on the same side of the heat exchanger but located towards the respective end portions thereof. The compressed gases (combustion supporting air) are supplied through inlet openings on the opposite side of the heat exchanger that are located toward the ends of the device and are led away through outlet openings in the central region of the device. These openings are not seen in the view given in FIG. 6, but their location can be understood by reference to the arrows indicating direction of flow. Flow direction arrows for the compressed air are in broken lines and those for the hot exhaust gases are in solid lines.

In the gas turbine equipment of FIG. 1, gas ducts 19 are connected from gas discharge 18 of the gas turbine through the heat exchanger elements 9. The cooled exhaust gas leaves the heat exchanger elements 9 through the outlet openings 16 at the end of the heat exchanger element and flows in a free space 20, inside the inner casing portion 2, provided for ducting the cooled exhaust gas. In order to make this possible, an important further development of the invention provides that the heat exchanger elements 9 are embedded or interposed between the inner and outer casing parts in such a way that a free space present between heat exchanger elements 9 and wall structure of the inner portion 2 is sealed gas-tight againt and from a free space present between heat exchanger elements 9 and wall structure of the outer casing portion 1. As a practical matter, therefore, in addition to the elastic interlay 11 of a material of a ceramic fiber base between the heat exchanger elements 9, similar interposed layers are provided between the end walls of the heat exchanger elements and the casing. In order that the thus obtained gas-tight closure should not be impaired or risk impairment by thermal expansion effects in the implementation of the invention, at least a portion of the heat exchanger elements 9 are displaceably arranged with respect to wedge pieces 28 having an effective pressure fit against the heat exchanger elements 9. As shown in FIG. 3, the wedge pieces 28 are set lengthwise along the heat exchanger elements and are held in their respective places between heat exchanger elements by means of compression springs 29. The wedge angle of wedge pieces and the spring pressures are so determined that the position of the wedge pieces automatically adjust to the thermal expansion of the heat exchanger elements.

The exhaust gases flow out of the free-space 20 to the exhaust pipe 21 and are thereby led away. In so doing they flow past a supporting frame 22 of the supports 10, this framework being open to the flow of gas. From the left hand portion of the space 20 shown in FIG. 1 the cooled exhaust gas flows through tubes 23 passing through the fan-shaped duct 19 of the hot exhaust gases, and the cooled exhaust gases leave the space 20 at the right through the openings 30. The hot exhaust gas 19 is thus fully surrounded by cooled exhaust gas.

The combustion supporting air, sucked in through an air inlet 24 by the compressor 3, flows as compressed gas in the embodiment illustrated in FIG. 1 in an outer annular free space 25 serving as a gas duct and built into the outer casing portion 1 that encloses it. From the free space 25 the compressed air flows through openings in the outer faces of the end portion of the heat exchangers elements 9 (into flow channels 14 of FIG. 6), flowing through the tubular openings 27 to reach the right hand ends of the heat exchanger elements 9 of FIG. 1. The presence of pressure above atmospheric pressure thus provided in the outer casing portion 1 compared with the pressure in the free space 20 in the inner casing portion 2 has the effect that the heat exchanger elements 9 are pressed onto the supports 10 and are secured against shifting. The heated compressed gas is led out of heat exchanger elements 9 from the central portions of the elements into the gas duct 26 that leads to the combustion chamber 5. As already mentioned, the gas duct 26 has tubular passages 27 letting through the still cold compressed gas that has not yet entered the heat exchanger elements 9 at their ends shown at the right in FIG. 1. The gas duct 26, where it passes through the free space 25, is surrounded by compressed gas that is still cold, and where it passes through the free-space 20 it is surrounded by cooled exhaust gas.

For connection of the gas ducts 19 and 26 to the heat exchanger elements 9, simple sealing elements are all that is required, because as a result of construction of the gas turbine installation in accordance with the invention there are only relatively small pressure differences present between the pressure in the gas ducts and the pressure in the volume surrounding the gas ducts.

In the case of the illustrative embodiments of gas turbine installations with an annular combustion chamber 5a, as illustrated in FIGS. 2 and 4, gas ducts 19a for the hot exhaust gas coming from the gas turbine 4 are located in the outer casing portion 1 and connected to the side of the heat exchanger elements 9 that faces the outer casing portion 1. Even in these illustrative embodiments the gas ducts 19 are surrounded by the exhaust gas cooled in the heat exchanger elements 9 and in this case flowing out into the free space 25a of the outer casing element 1. The combustion supporting air sucked in by the compressor 3 flows through a free space 20a on the inside of casing portion 2 and through inflow openings of the heat exchangers 9 located in the end portions thereof. After being heated in the heat exchanger elements, the compressed gas flows through a gas duct 26a directly into the annular combustion chamber 5a. Gas duct 26a is fully surrounded by cold gas in the same manner as in the embodiment illustrated in FIG. 1.

Figure 5:
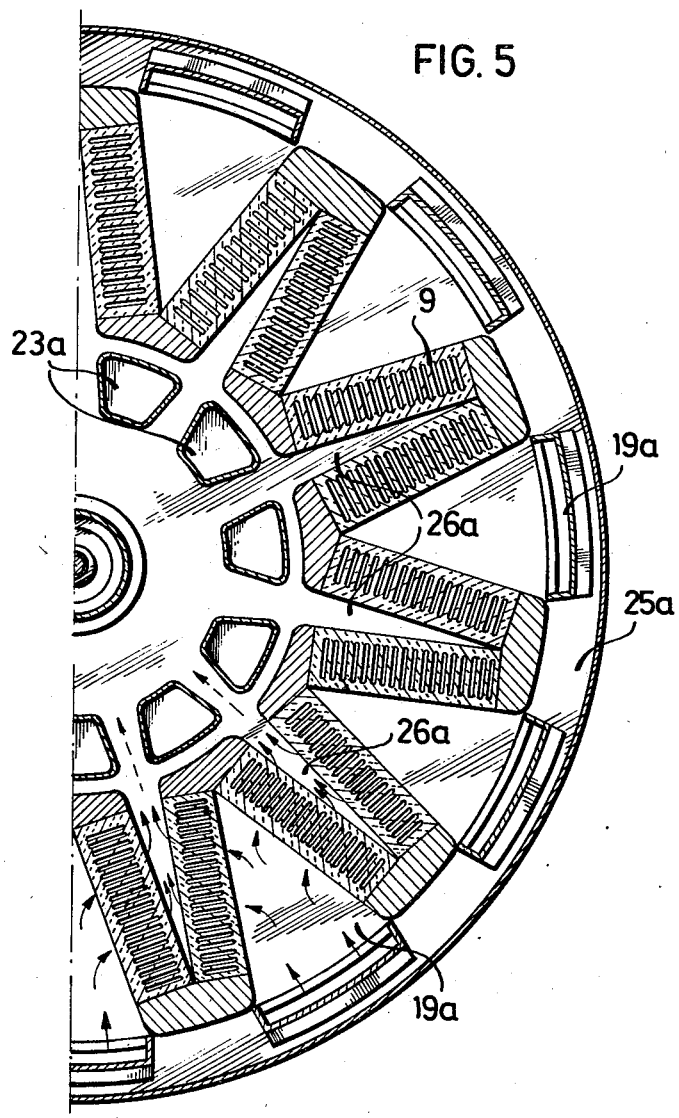
FIG. 5 is a cross-section through the ring of heat exchanger elements of the equipment of FIG. 4, in the plane indicated by the line V—V of FIG. 4, only half the section being shown in FIG. 5

In the illustrative embodiment of FIGS. 4 and 5, the gas ducts 19a and 26a have a radial taper between adjacent heat exchanger elements 9 of a group arranged in star-shaped configuration. The ducts accordingly have a wedge-shaped profile as shown in FIG. 5.

The constitution of a gas turbine installation according to the invention takes particular advantage of the use of ceramic heat exchanger elements which, as shown in FIG. 6, have, in addition to openings for in and out flow near the ends of the elements also have openings for in and out flow of media in the middle portion of the elements, so that each of the media involved in heat exchange flows in two opposite directions. Heat exchangers of this type are known as so-called double-flow heat exchangers. They have the advantage of having the hottest portion of the heat exchanger in the middle and thus reducing thermal expansion stresses at the ends.

Although the invention has been described with reference to several illustrative embodiments, it will be readily understood that variations and modifications are possible, in addition to the one just mentioned, within the inventive concept.

We claim:

1. A gas turbine power unit for a vehicle, of a kind including a combustion chamber having means for supplying fuel thereto, a compressor for supplying compressed air to said combustion chamber, a gas turbine for driving a drive shaft of the vehicle by the hot gases produced in said combustion chamber, and a counter-current heat exchanger for preheating the air compressed by said compressor with heat derived from the exhaust gases of said gas turbine, said gas turbine and combustion chamber having a common axis of symmetry, said gas turbine power unit also incorporating the improvement which consists in that:

said heat exchanger is a recuperative heat exchanger comprising a plurality of heat exchanger elements in an assembly of ring-like configuration encircling said compressor (3), turbine (4) and combustion chamber (5a) and consists of ceramic heat exchanger elements (9) of elongated block form through which said exhaust gases and compressed air flow in counter-current to each other;

each said heat exchanger element has closed end surfaces and has orifices on two opposite sides respectively for the hot exhaust gases and for the compressed air, said orifices in each case including both orifices in the middle and orifices adjacent to each said end surface of the element, the set of orifices on each side being connected by longitudinal flow channels, the longitudinal flow channels of the respective sets of orifices being interleaved to facilitate heat exchange;

ducting and heat exchanger mounting is provided for supplying the hot exhaust gases to orifices in the middle of said heat exchanger element, thereby used as inlets, and for leading said hot exhaust gases from the corresponding orifices at the element ends used as outlets and also for supplying, on the opposite side of the elements, the compressed air to orifices at the element ends used as inlets and for leading said compressed air away from said elements at orifices in the middle of said heat exchanger elements, thereby used as outlets, whereby the end portions of said elements are cooler in operation than the middle portions thereof and and thereby less exposed to high temperature, and said heat exchanger elements (9) are supported on a supporting structure (10) having elastic members (11) capable of compensating for or accommodating to thermal expansion effects.

2. A gas turbine power unit defined in claim 1 which is provided with a metallic casing and in which the heat exchanger elements (9) are mounted around an inner casing portion (2) in which casing portion said compressor (3) and said gas turbine (4) are mounted and in which units, further, said casing also has an external casing portion (1) that surrounds said heat exchanger elements (9) as an outer shell and ducts constituting part of said ducting for connecting with one side of each of said elements, located between said elements and said external casing portion.

3. A gas turbine power unit as defined in claim 2, in which said ducts located between said outer casing portion and said heat exchanger elements are ducts for carrying said compressed air, whereby said elements are urged inward by air pressure.

4. A gas turbine power unit as defined in claim 1, in which said ducting and the connections of said heat exchanger elements (9) for the flow thereto and therefrom of the hot exhaust gases are so arranged that cooled exhaust gas flows in said ducting around and over the portion of said ducting supplying the hot exhaust gas and on all sides of said portion of said ducting.

5. A gas turbine power unit as defined in claim 4, in which said portion (19, 19a) of said ducting for supplying the hot exhaust gases are located within the portion of said ducting (20, 25a) provided for leading away the cooled exhaust gases.

6. A gas turbine power unit as defined in claim 5, in which at least a part of the structure of said ducting (20, 20a, 25, 25a) is formed as a load carrying casing wall of said power unit.

7. A gas turbine power unit as defined in claim 1 in which said heat exchanger elements (9) are axially oriented in said power unit and are arranged in a ring-like configuration having a delta-shaped cross-section in a plane perpendicular to said axis of symmetry.

8. A gas turbine power unit as defined in claim 1 in which said heat exchanger elements (9) are axially oriented in said power unit and are arranged in a ring-shaped configuration having a star shape in a plane perpendicular to said common axis of symmetry.

9. A gas turbine power unit as defined in claim 2, in which said heat exchanger elements (9) are so built in between said inner and outer casing portion (1, 2), that a free space (20, 20a) provided between said heat exchanger elements (9) and wall portions of said inner casing portion (2) is sealed gas-tight against and from a free space (25, 25a) provided between heat exchanger elements (9) and wall portions of said outer casing portion (1).

10. A gas turbine power unit as defined in claim 7, in which wedge pieces (28) between the members of at least some pairs of adjacent heat exchanger elements (9) are closely fitted, under force applied by additional elastic members (29) in an arrangement in which the wedge surfaces of said wedge pieces are parallel to said common axis of symmetry so as to permit sliding on said wedge surfaces for relative accommodation of at least some of the adjacent heat exchanger elements (9).

11. A gas turbine power unit as defined in claim 4, in which said ducting and connections of said heat exchanger elements (9) for the flow thereto and therefrom of the compressed air are so arranged that cooler air being supplied to said heat exchanger elements flows in said ducting around and over the portion of said ducting that leads away the preheated air, on all sides of said just-mentioned portion of said ducting.

12. A gas turbine power unit as defined in claim 3, in which said combustion chamber is pot-shaped and substantially centered on said common axis of symmetry and extends from near the center of said power unit toward one axial end thereof, said combustion chamber having compressed air inlets around its periphery in a portion thereof remote from the center of said power unit and exhaust gas outlets leading to said turbine located centrally in said power unit for flow therefrom to the inward middle orifices of said heat exchanger elements which thereby serve as hot exhaust gas inlets, and in which, further, said compressor is located near the other axial end of said power unit and supplies compressed air to space between said outer casing portion and said heat-exchanger elements to inlets in the end portions of the outer sides of said heat-exchanger elements, utilizing said outer casing portion (1) as part of the compressed air portion of said ducting, and in which, further, the outflow portion of the compressed air ducting portion leads from the middle of the outer faces of said heat-exchanger elements to said peripherial inlets of said combustion chamber and is surrounded by the inlet portion of said compressed air ducting portion in the portion of its path which is radially outward of said heat-exchanger elements, and in which, further, the portion of said ducting leading away cooled exhaust gases is constituted by space between said turbine and said compressor, between said compressor and said heat-exchanger elements, and between said combustion chamber and said heat-exchanger elements, whereby said cooled exhaust gases surround the portion of said ducting leading hot exhaust gases from said turbine to said heat exchanger elements to flow around and past said combustion chamber and out of said unit at an axial end thereof.

13. A gas turbine power unit as defined in claim 2, in which the central portion of said unit, centered on said common axis of symmetry is occupied by said turbine and said compressor, and said combustion chamber is of annular form in an axial position intermediate the axial postions of said turbine and of said compressor, and in which, further, the air inlets of said combustion chamber are connected to the middle inward orifices of said heat exchanger elements, which thereby serve as outlet orifices, by a first portion of said ducting and the compressed air furnished by said compressor is arranged to flow through a space of said heat-exchanger elements to inlet orifices in both end portions of said heat-exchanger elements so that a portion of said compressed air will flow around said first portion of said ducting, and in which, further, the hot gases produced by said combustion chamber flow in annular ducting through said turbine and around one end of said heat exchanger elements and back to external middle orifices of said elements and the cooled exhaust gases issue at external end portion orifices of said elements into a portion of said ducting utilizing said outer casing portion (1) as an external wall, so as to flow around the inlet ducting for said exhaust gases and then beyond the same end of said elements as said annular ducting goes around, to lead said cooled exhaust gases out of said power unit.

14. A gas turbine power unit as defined in claim 8, in which said compressor and said gas turbine essentially occupy space immediately surrounding said common axis of symmetry in said power unit and said combustion chamber is of annular configuration near the center of said power unit and discharges hot exhaust gases to said turbine in an annular stream, and a portion of said ducting leads said hot exhaust gases around one end of all said heat-exchanger elements to a central wedge-shaped space communicating with outward facing mid-portion orifices of said elements, which are thereby used as hot exhaust gas inlets, the outward facing end-portion orifices of said elements being in communication with endwise located wedge-shaped spaces on each end of said central wedge-shaped spaces, from which endwise located spaces said ducting leads cooled exhaust gases away, around the hot exhaust gas portion of said ducting toward one axial end of said power unit, and in which, further, the preheated air inlet connections of said combustion chamber communicate with inward facing central wedge-shaped spaces between said heat exchanger elements communicating with inward facing middle orifices of said elements, serving as preheated air outlets, and the fresh compressed air provided by said compressor is guided by said ducting, in a space inward of said heat exchanger elements where it flows around the connections providing preheated air to said combustion chamber, to endwise located inward facing wedge-shaped spaces located on both sides of said inward facing central wedge-shaped spaces, in communication with end portion inward facing orifices of said heat-exchanger elements.

* * * * *